（12） United States Patent
Byun et al.

(10) Patent No.: US 10,321,431 B2
(45) Date of Patent: Jun. 11, 2019

(54) METHOD AND APPARATUS FOR PERFORMING PAGING

(71) Applicant: LG ELECTRONICS INC., Seoul (KR)

(72) Inventors: Daewook Byun, Seoul (KR); Sangwook Han, Seoul (KR); Jinsook Ryu, Seoul (KR); Jian Xu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/773,552

(22) PCT Filed: Oct. 27, 2016

(86) PCT No.: PCT/KR2016/012131
§ 371 (c)(1),
(2) Date: May 3, 2018

(87) PCT Pub. No.: WO2017/078323
PCT Pub. Date: May 11, 2017

(65) Prior Publication Data
US 2018/0324750 A1    Nov. 8, 2018

Related U.S. Application Data

(60) Provisional application No. 62/251,095, filed on Nov. 4, 2015.

(51) Int. Cl.
*G08C 17/00*    (2006.01)
*H04W 68/02*    (2009.01)
(Continued)

(52) U.S. Cl.
CPC ....... *H04W 68/02* (2013.01); *H04W 72/0446* (2013.01); *H04W 76/20* (2018.02); *H04W 76/28* (2018.02); *H04W 92/04* (2013.01)

(58) Field of Classification Search
USPC .................................................. 370/311, 310
See application file for complete search history.

(56) References Cited

U.S. PATENT DOCUMENTS

| | | | |
|---|---|---|---|
| 2010/0130237 A1 | 5/2010 | Kitazoe et al. | |
| 2013/0003629 A1* | 1/2013 | Jeong ................ | H04W 52/0216 370/311 |

(Continued)

FOREIGN PATENT DOCUMENTS

KR    1020150064196    6/2015

OTHER PUBLICATIONS

PCT International Application No. PCT/KR2016/012131, International Search Report dated Jan. 19, 2017, 4 pages.
(Continued)

*Primary Examiner* — David Q Nguyen
(74) *Attorney, Agent, or Firm* — Lee Hong Degerman Kang Waimey

(57) ABSTRACT

Provided are a method for performing paging by a mobility management entity (MME) in a wireless communication system and an apparatus for supporting the same. The MME comprises: receiving an nB from a base station; calculating a paging frame (PF) on the basis of the nB; and transmitting a paging message to the base station on the basis of a paging hyperframe (PH) and the calculated PF, wherein the PH may indicate a number of a hyper system frame in which the paging message is to be transmitted, and the PH may indicate a number of a system frame in which the paging message is to be transmitted.

15 Claims, 9 Drawing Sheets

(51) Int. Cl.
*H04W 92/04* (2009.01)
*H04W 76/20* (2018.01)
*H04W 76/28* (2018.01)
*H04W 72/04* (2009.01)

(56) References Cited

U.S. PATENT DOCUMENTS

2015/0237577 A1* 8/2015 Zhang ................... H04W 4/70
                                                    370/311
2018/0176883 A1* 6/2018 Fujishiro ........... H04W 52/0225
2018/0263012 A1* 9/2018 Ryu ..................... H04W 68/02

OTHER PUBLICATIONS

Qualcomm, "Hyper-SFN paging procedures for eDRX", 3GPP TSG RAN WG2 Meeting #91bis, R2-154846, Oct. 2015, 6 pages.

* cited by examiner

METHOD AND APPARATUS FOR PERFORMING PAGING

CROSS-REFERENCE TO RELATED APPLICATIONS

This application is the National Stage filing under 35 U.S.C. 371 of International Application No. PCT/KR2016/012131, filed on Oct. 27, 2016, which claims the benefit of U.S. Provisional Application No. 62/251,095, filed on Nov. 4, 2015, the contents of which are all hereby incorporated by reference herein in their entirety.

BACKGROUND OF THE INVENTION

Field of the Invention

The present invention relates to a wireless communication system and, more particularly, to a method for performing paging by an MME in a wireless communication system, and an apparatus supporting the same.

Related Art

3rd Generation Partnership Project (3GPP) Long Term Evolution (LTE) that is an advancement of Universal Mobile Telecommunication System (UMTS) is being introduced with 3GPP release 8. In 3GPP LTE, orthogonal frequency division multiple access (OFDMA) is used for downlink, and single carrier-frequency division multiple access (SC-FDMA) is used for uplink. The 3GPP LTE adopts multiple input multiple output (MIMO) having maximum four antennas. Recently, a discussion of 3GPP LTE-Advanced (LTE-A) which is the evolution of the 3GPP LTE is in progress.

SUMMARY OF THE INVENTION

According to extended discontinuous reception (eDRX), a long idle mode may be set for a user equipment (UE). When a mobility management entity (MME) transmits a paging message to a base station (BS) on the basis of a paging hyperframe (PH), since the MME does not know a paging frame (PF) in the PH, a large number of S1 signallings may occur at a particular time (e.g., at the beginning of the PH). Thus, it is necessary to propose a new method for an MME to perform paging for an eDRX-supportive UE.

According to an embodiment, there is provided a method for performing paging by an MME in a wireless communication system. The MME may include: receiving an nB from a BS; computing a PF on the basis of the nB; and transmitting a paging message to the BS on the basis of a PH and the computed PF, wherein the PH may indicate a number of a hyper system frame via which the paging message is transmitted, and the PF may indicate a number of a system frame via which the paging message is transmitted.

The paging message may be transmitted via at least any one subframe belonging to the system frame indicated by the PH and the PF.

The nB may be included in an S1 Setup Request message.

The nB may be included in an S1 eNB Configuration Update message.

The PF may be computed on the basis of the nB, UE_ID, and a DRX cycle.

The PF may be an SFN satisfying the following formula:

$$\text{SFN mod } T = (T \text{ div } N) * (UE\_ID \text{ mod } N),$$

where T may denote the DRX cycle of a user equipment (UE), UE_ID may be a remainder obtained by dividing an international mobile subscriber identity (IMSI) of the UE by 1024, and N may be a smaller value of the DRX cycle and the nB.

The nB may be any one of 4T, 2T, T, T/2, T/4, T/8, T/16, and T/32.

The PH may be computed on the basis of UE_ID and an eDRX cycle.

The PH may be a hyper-system frame number (H-SFN) satisfying the following formula:

$$\text{H-SFN mod } T_{eDRX,H} = UE\_ID \text{ mod } T_{eDRX,H},$$

where $T_{eDRX,H}$ may denote the eDRX cycle of a UE, and UE_ID may be a remainder obtained by dividing an IMSI of the UE by 1024.

The MME may further include storing the paging message.

The paging may be performed for a UE with extended discontinuous reception (eDRX) set up.

The hyper system frame may include 1024 system frames.

According to another embodiment, there is provided an MME for performing paging in a wireless communication system. The MME may include: a memory; a transceiver; and a processor to connect the memory and the transceiver, wherein the processor may be configured to: control the transceiver to receive an nB from a base station (BS); compute a paging frame (PF) on the basis of the nB; and control the transceiver to transmit a paging message to the BS on the basis of a paging hyperframe (PH) and the computed PF, the PH may indicate a number of a hyper system frame via which the paging message is transmitted, and the PF may indicate a number of a system frame via which the paging message is transmitted.

It is possible to prevent S1 signaling by an MME from occurring intensively at a particular time.

DESCRIPTION OF EXEMPLARY EMBODIMENTS

The technology described below can be used in various wireless communication systems, such as code division multiple access (CDMA), frequency division multiple access (FDMA), time division multiple access (TDMA), orthogonal frequency division multiple access (OFDMA), or single carrier frequency division multiple access (SC-FDMA). CDMA can be implemented with a radio technology, such as universal terrestrial radio access (UTRA) or CDMA-2000. TDMA can be implemented with a radio technology, such as global system for mobile communications (GSM)/general packet ratio service (GPRS)/enhanced data rate for GSM evolution (EDGE). OFDMA can be implemented with a radio technology, such as Institute of Electrical and Electronics Engineers (IEEE) 802.11 (Wi-Fi), IEEE 802.16 (WiMAX), IEEE 802.20, or evolved UTRA (E-UTRA). IEEE 802.16m has evolved from IEEE 802.16e and provides backward compatibility with a system based on IEEE 802.16e. UTRA is a part of a universal mobile telecommunication system (UMTS). Third generation partnership project (3GPP) long-term evolution (LTE) is a part of evolved UMTS (E-UMTS) using E-UTRA. 3GPP LTE uses OFDMA for a downlink and uses SC-FDMA for an uplink. LTE-advanced (LTE-A) is an evolution of 3GPP LTE.

For clarity, the following description will focus on LTE-A. However, technical features of the present invention are not limited thereto.

Figure 1:
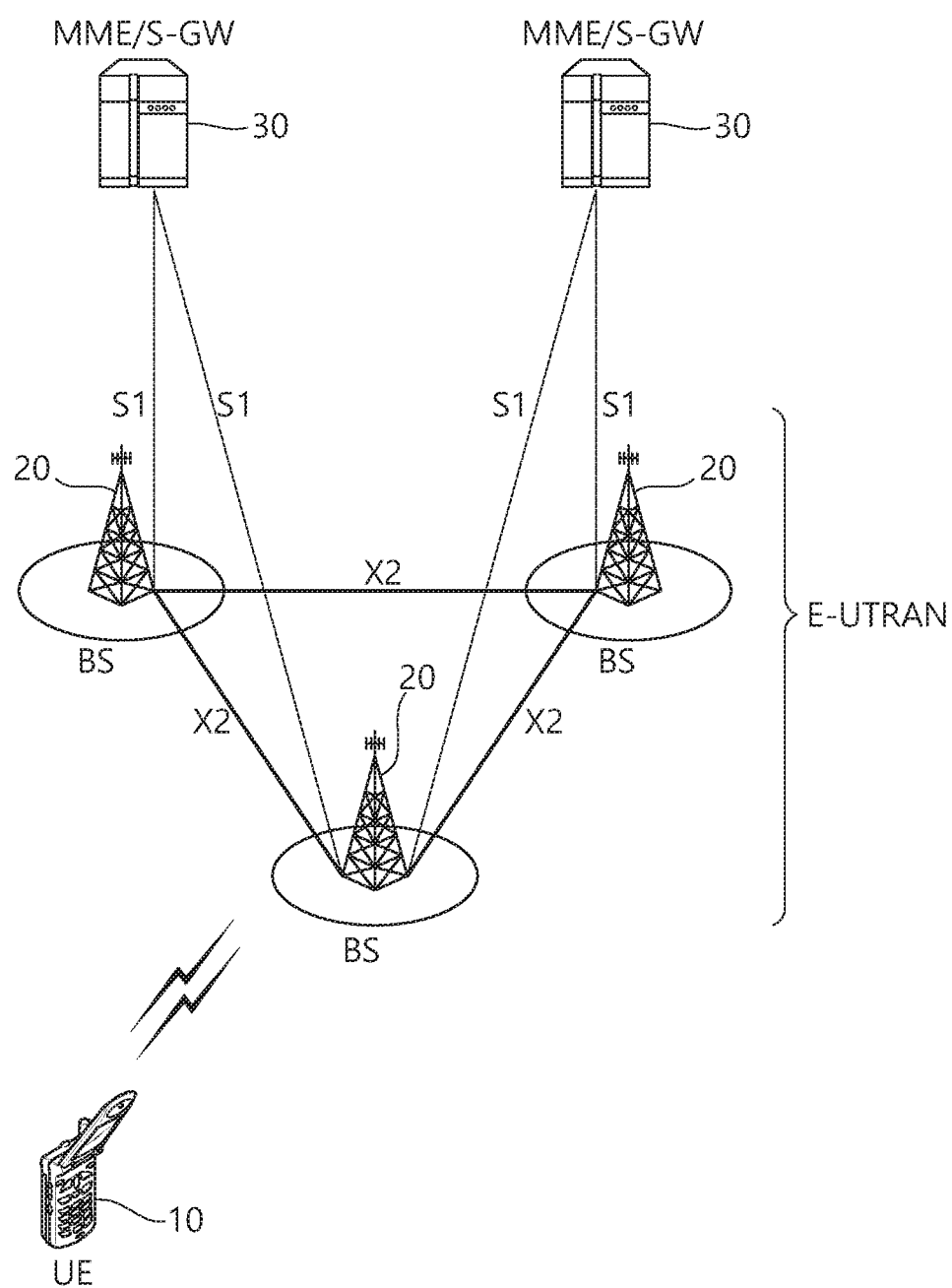
FIG. 1 shows LTE system architecture.

FIG. 1 shows LTE system architecture. A communication network is widely deployed to provide a variety of communication services, such as Voice over Internet Protocol (VoIP) through IMS and packet data.

Referring to FIG. 1, the LTE system architecture includes one or more user equipment (UE) 10, an evolved-UMTS terrestrial radio access network (E-UTRAN), and an evolved packet core (EPC). The UE 10 refers to a communication device carried by a user. The UE 10 may be stationary or mobile and may be referred to as another term, such as a mobile station (MS), a user terminal (UT), a subscriber station (SS), or a wireless device.

The E-UTRAN may include one or more evolved nodes-B (eNBs) 20, and a plurality of UEs may be located in one cell. The eNB 20 provides an end point of each of a control plane and a user plane to the UE 10. The eNB 20 generally refers to a fixed station that communicates with the UE 10 and may be referred to as another term, such as a base station (BS), a base transceiver system (BTS), or an access point. A single eNB 20 may be deployed per cell. There are one or more cells within the coverage of the eNB 20. A single cell may be configured to have one bandwidth selected from among 1.25, 2.5, 5, 10, and 20 MHz and may provide downlink (DL) or uplink (UL) transmission services to a plurality of UEs. In this case, different cells may be configured to provide different bandwidths.

Hereinafter, DL denotes communication from the eNB 20 to the UE 10, and UL denotes communication from the UE 10 to the eNB 20. In DL, a transmitter may be a part of the eNB 20, and a receiver may be a part of the UE 10. In UL, a transmitter may be a part of the UE 10, and a receiver may be a part of the eNB 20.

The EPC may include a mobility management entity (MME) that functions as a control plane and a system architecture evolution (SAE) gateway (S-GW) that functions as a user plane. The MME/S-GW 30 may be positioned at the end of the network and is connected to an external network. The MME has UE access information or UE capability information, which may be used mainly for UE mobility management. The S-GW is a gateway of which an endpoint is an E-UTRAN. The MME/S-GW 30 provides the UE 10 with an end point of a session and a mobility management function. The EPC may further include a packet data network (PDN) gateway (PDN-GW). The PDN-GW is a gateway of which an endpoint is a PDN.

The MME provides a variety of functions including non-access stratum (NAS) signaling to eNBs 20, NAS signaling security, access stratum (AS) security control, inter core network (CN) node signaling for mobility between 3GPP access networks, idle-mode UE reachability (including control and execution of paging retransmission), tracking area list management (for a UE in an idle or active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS, which includes earthquake and tsunami warning system (ETWS) and commercial mobile alert system (CMAS)) message transmission. An S-GW host provides assorted functions including per-user based packet filtering (for example, by deep packet inspection), lawful interception, UE Internet Protocol (IP) address allocation, transport-level packet marking in DL, UL and DL service level charging, gating and rate enforcement, and DL rate enforcement based on APN-AMBR. For clarity, the MME/S-GW 30 will be referred to simply as a "gateway," which may include both the MME and the S-GW.

Interfaces for transmitting user traffic or control traffic may be used. The UE 10 and the eNB 20 may be connected via a Uu interface. The eNBs 20 may be interconnected via an X2 interface. Neighboring eNBs may have a meshed network structure via the X2 interface. The eNBs 20 may be connected to the EPC via an S1 interface. The eNBs 20 may be connected to the MME via an S1-MME interface and may be connected to the S-GW via an S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in an LTE active state. In the EPC, and as noted above, gateway 30 may perform functions of paging origination, LTE idle state management, ciphering of the user plane, SAE bearer control, and ciphering and integrity protection of NAS signaling.

Figure 2:
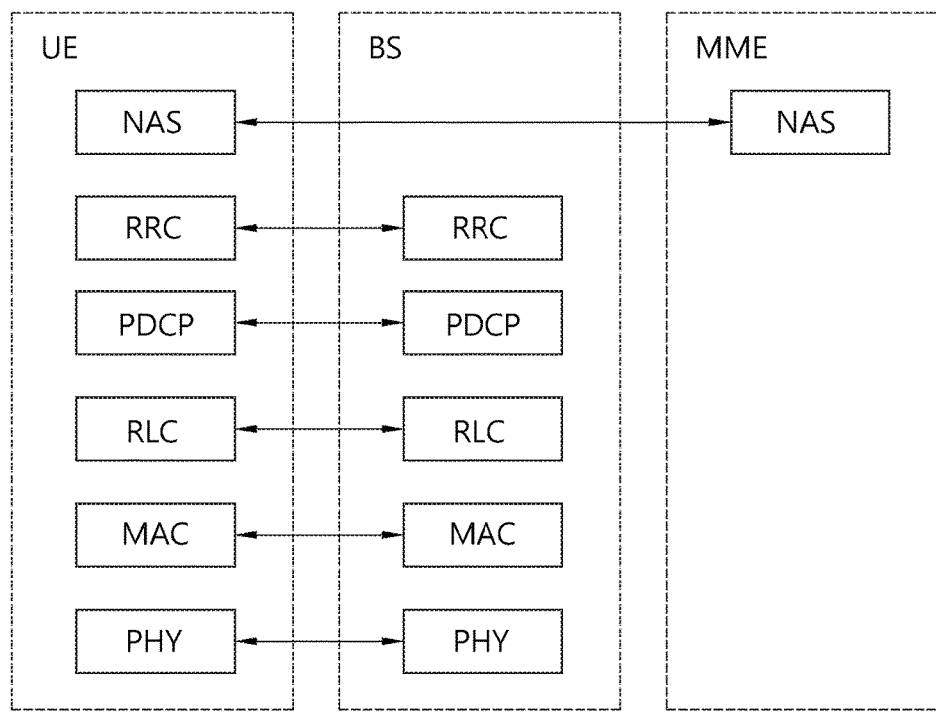
FIG. 2 shows radio interface protocols of a control plane for an LTE system.
Figure 3:
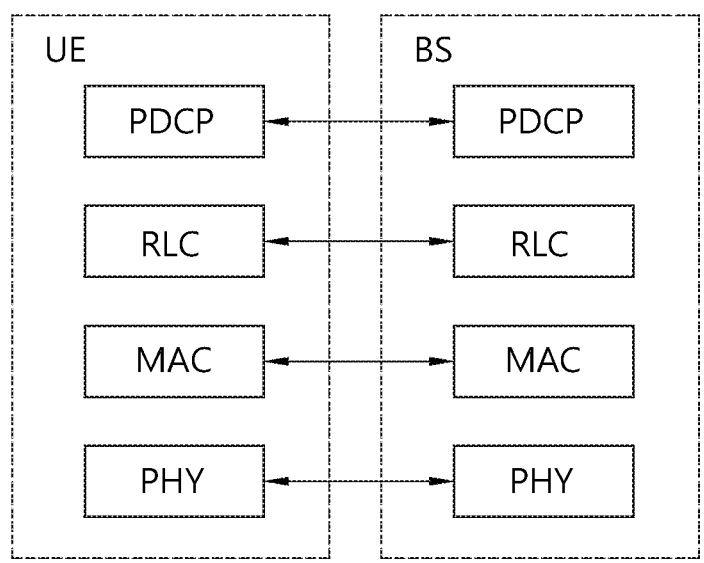
FIG. 3 shows radio interface protocols of a user plane for an LTE system.

FIG. 2 shows radio interface protocols of a control plane for an LTE system, and FIG. 3 shows radio interface protocols of a user plane for an LTE system.

Radio interface protocol layers between a UE and an E-UTRAN may be classified into a first layer (L1), a second layer (L2), and a third layer (L3) based on the lower three layers of the open system interconnection (OSI) model that is well-known in the communication system. The radio interface protocols between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocols exist in pairs at the UE and the E-UTRAN and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel Between different PHY layers, that is, a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

An MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, that is, a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, that is, a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, an RRC State of a UE and an RRC Connection Procedure are Described.

An RRC state indicates whether an RRC layer of the UE is logically connected to an RRC layer of the E-UTRAN. The RRC state may be divided into two different states, which are an RRC connected state (RRC_CONNECTED) and an RRC idle state (RRC_IDLE). When an RRC connection is established between the RRC layer of the UE and the RRC layer of the E-UTRAN, the UE is in RRC_CONNECTED. Otherwise, the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage the mobility of the UE in the NAS layer, two states are defined, that is, an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, that is, an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM- IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility-related procedure such as cell selection or reselection without having to receive a command of the network. On the other hand, when the UE is in the ECM-CONNECTED state, mobility of the UE is managed by the command of the network. If the location of the UE in the ECM-IDLE state becomes different from a location known to the network, the UE reports the location of the UE to the network through a tracking area update procedure.

Hereinafter, Discontinuous Reception (DRX) Will be Described in Detail.

Figure 4:
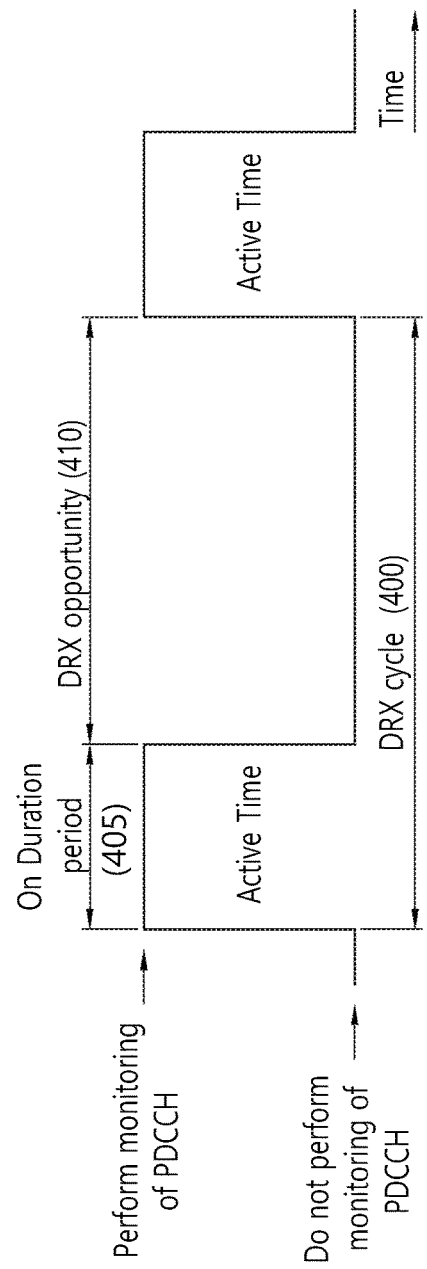
FIG. 4 shows an example of DRX operations.

FIG. 4 shows an example of DRX operations.

Referring to FIG. 4, the DRX operation is repeated in DRX cycle 400 units. The DRX cycle 400 is defined as a periodic repetition of an opportunity for DRX 410 and an On Duration 405. The DRX cycle 400 of one period includes an On Duration 405 and an opportunity for DRX 410. Herein, for example, a long DRX cycle being applied to a range of 10 subframes to 2560 subframes exists, and, as another example, a short DRX cycle being applied to a range of 2 subframes to 640 subframes exists. At this point, the short DRX cycle is applied only while a DRX Short Cycle Timer (drxShortCycleTimer) is being operated, and the long DRX cycle is applied outside of the operation range of the drxShortCycleTimer. Herein, a basic unit of the drxShortCycleTimer corresponds to one short DRX cycle. At this point, for example, a length of the drxShortCycleTimer may range from 1 to 16. In case the user equipment is being operated at a short DRX cycle, this may be referred to as a short DRX mode, and, in case the user equipment is being operated at a long DRX cycle, this may be referred to as a log DRX mode.

A RRC layer manages some of the timers in order to control the DRX operation. The timers controlling the DRX operation correspond to an "on Duration" Timer (onDurationTimer), a DRX Inactivity Timer (drxInactivity Timer), a DRX Retransmission Timer (drxRetransmission Timer), and so on.

The onDurationTimer starts when the DRX cycle starts. In other words, a start point of the onDurationTimer is the same as a start point of the DRX cycle. A value of the onDurationTimer is incremented by 1 at each PDCCH subframe. Thereafter, the onDurationTimer is expired when the onDurationTimer value reaches a predetermined expiration value. The onDurationTimer is effectively (or validly) operated until the onDurationTimer value reaches the expiration value.

The drxInactivity Timer may be defined as a number of continuous PDCCH subframes starting from a time point of successfully decoding a PDCCH for uplink or downlink user data transmission. Since continuous data reception may occur, this corresponds to a time period during which the user equipment is required to continuously monitor the PDCCH. The drxInactivity Timer is started or re-started when the user equipment has successfully decoded a PDCCH for an initial HARQ transmission.

The drxRetransmission Timer corresponds to a timer that operates based on a maximum value corresponding to a number of continuous PDCCH subframes that are expected to be immediately re-transmitted by the user equipment via downlink. The drxRetransmission Timer corresponds to a timer that starts in a case when the user equipment fails to receive re-transmission data even after an expiration of a HARQ RTT timer. While the drxRetransmission Timer is activated, the user equipment may monitor the reception of the re-transmitted data during a HARQ process. The configuration of the drxRetransmission Timer is defined in a MAC-MainConfig message of the RRC layer.

A time period during which the onDurationTimer, the drxInactivity Timer, or the drxRetransmission Timer are active (or being operated) is referred to as an active time. Alternatively, the active time also refer to all time periods during which the user equipment is in an awake state. During the DRX cycle, a time period that does not correspond to the active time may be referred to as a Non-active time. The active time may also be referred to as a Wake-up period, and the Non-active time may be referred to as a Sleep period. During the active time, the user equipment monitors the PDCCH for a PDCCH subframe. Herein, a PDCCH subframe refers to subframe including a PDCCH. For example, in a TDD configuration, downlink subframes and Downlink Pilot Time Slot (DwPTS) subframes correspond to the PDCCH subframe. A timer unit of DRX timers, such as the onDurationTimer, the drxInactivity Timer, or the drxRetransmission Timer corresponds to a PDCCH subframe (psf). More specifically, the DRX timers are counted based on a number of PDCCH subframes.

Additionally, other parameters controlling the DRX operation may include a long DRX cycle (longDRX-Cycle) and a DRX start offset (drxStartOffset). Herein, the base station may optionally (or selectively) configure a drxShortCycleTimer and a shortDRX-Cycle. Also, a HARQ round trip time (RTT) timer is defined for each downlink HARQ process.

The drxStartOffset corresponds to a value that determine a subframe from which the DRX cycle 400 starts. The drxShortCycleTimer corresponds to a timer defining a number of continuous subframe during which the UE should follow the shortDRX-Cycle. The HARQ RTT corresponds to a timer defining a minimum number of subframes before the period during which downlink HARQ re-transmission is expected to be performed by the user equipment.

Meanwhile, DRX configuration information may be received by being included in a MAC-MainConfig message, which corresponds to a RRC message being used for indicating the main configuration of a MAC layer for a signaling radio bearer (SRB) and a data radio bearer (DRB).

Hereinafter, Paging Will be Described.

A paging procedure may be used for a network to transmit paging information to a UE in RRC_IDLE. Alternatively, a paging procedure may be used for a network to report a change in system information to a UE in RRC_IDLE/RRC_CONNECTED. Alternatively, a paging procedure may be used for a network to report an ETWS primary notification and/or an ETWS secondary notification to a UE in RRC_IDLE/RRC_CONNECTED. Alternatively, a paging procedure may be used for a network to report a CMAS notification to a UE in RRC_IDLE/RRC_CONNECTED.

Figure 5:
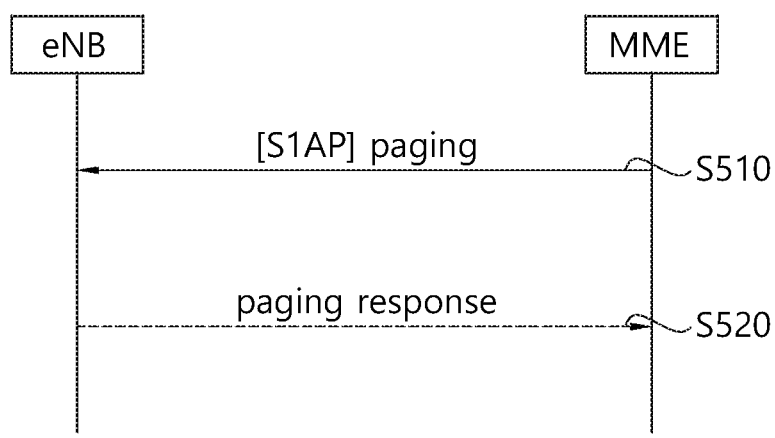
FIG. 5 shows an example of a paging procedure.

FIG. 5 shows an example of a paging procedure.

Referring to FIG. 5, in step S510, an MME may transmit a paging message to an eNB, thereby starting a paging procedure. The paging message may also be referred to as an S1AP paging message. The location of a UE in an ECM-IDLE state is managed by the MME on the basis of a TA. Here, since the UE may be registered in one or more TAs, the MME may transmit the paging message to a plurality of eNBs covering a cell belonging to the TA(s) in which the UE is registered. Here, each cell can belong to only one TA, and each eNB may include cells belonging to different TAs.

In step S520, a paging response to be transmitted to the MME may be initiated in an NAS layer and may be transmitted by the eNB on the basis of NAS-level routing information. That is, the paging response may correspond to a service request NAS message transmitted from the UE.

Table 1 below illustrates an example of an S1AP paging message.

TABLE 1

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| UE Identity Index value | M | | 9.2.3.10 | | YES | ignore |
| UE Paging Identity | M | | 9.2.3.13 | | YES | ignore |
| Paging DRX | O | | 9.2.1.16 | | YES | ignore |
| CN Domain | M | | 9.2.3.22 | | YES | ignore |
| List of TAIs | | 1 | | | YES | ignore |
| >TAI List Item | | 1 ... <maxnoofTAIs> | | | EACH | ignore |
| >>TAI | M | | 9.2.3.16 | | — | |
| CSG Id List | | 0 ... 1 | | | GLOBAL | ignore |
| >CSG Id | | 1 ... <maxnoofCSGId> | 9.2.1.62 | | — | |
| Paging Priority | O | | 9.2.1.78 | | YES | ignore |
| UE Radio Capability for Paging | O | | 9.2.1.98 | | YES | ignore |

The Message Type IE may uniquely identify a transmitted message.

The UE Identity Index value IE may be used for an eNB to compute a paging frame (PF). For example, UE Identity Index=UE IMSI mod 1024.

The UE Paging Identity IE is an identifier for identifying a paged UE and may be either an International Mobile Subscriber Identity (IMSI) or an SAE Temporary Mobile Subscriber Identity (S-TMSI). An S-TMSI refers to an identifier for uniquely identifying a UE in a single MME group. In general paging, an S-TMSI is used as a UE paging identifier. When an IMSI is used as a UE paging identifier, paging includes the IMSI. When paged with an IMSI value, the UE may perform a re-attach procedure.

The Paging DRX IE may be used for an eNB to compute a PF when a UE uses a UE-specific DRX cycle length. The UE may specify the DRX cycle length via an attach request message or a TAU message.

The CN Domain IE may indicate whether paging occurs in a circuit switched (CS) or a packet switched (PS) domain.

The tracking area identity (TAI) List IE may be used for an MME to report to an eNB a TA in which a paging message needs to be broadcast. A TAI refers to an identifier used for uniquely identifying a TA.

The closed subscriber group (CSG) ID List IE may indicate a CSG set that a UE joins. This IE is used to prevent an eNB from paging a UE in a CSG cell that the UE does not join.

Upon receiving the S1AP paging message from the MME, the eNB may construct a paging message. The paging message may be referred to as an RRC paging message or paging information. Table 2 illustrates an example of a paging message constructed by the eNB.

TABLE 2

```
-- ASN1START
Paging ::=                    SEQUENCE {
    pagingRecordList          PagingRecordList OPTIONAL,        -- Need ON
    systemInfoModification    ENUMERATED {true}    OPTIONAL,    -- Need ON
    ctws-Indication           ENUMERATED {true}    OPTIONAL,    -- Need ON
    nonCriticalExtension      Paging-v890-IEs      OPTIONAL     -- Need OP
}
Paging-v890-IEs ::=           SEQUENCE {
    lateNonCriticalExtension  OCTET STRING         OPTIONAL,    -- Need OP
    nonCriticalExtension      Paging-v920-IEs      OPTIONAL     -- Need OP
}
Paging-v920-IEs ::=           SEQUENCE {
    cmas-Indication-r9        ENUMERATED {true}    OPTIONAL,    -- Need ON
    nonCriticalExtension      Paging-v1130-IEs     OPTIONAL     -- Need OP
}
Paging-v1130-IEs ::=          SEQUENCE {
    eab-ParamModification-r11 ENUMERATED {true}    OPTIONAL,    -- Need ON
    nonCriticalExtension      SEQUENCE { }         OPTIONAL     -- Need OP
}
PagingRecordList ::=          SEQUENCE (SIZE (1..maxPageRec)) OF PagingRecord
PagingRecord ::=              SEQUENCE {
    ue-Identity                   PagingUE-Identity,
    cn-Domain                     ENUMERATED   {ps, cs},
    ...
}
PagingUE-Identity ::=         CHOICE {
    s-TMSI                        S-TMSI,
    imsi                          IMSI,
    ...
}
IMSI ::=                      SEQUENCE (SIZE (6..21)) OF IMSI-Digit
IMSI-Digit ::=                INTEGER (0..9)
-- ASN1STOP
```

When the RRC paging message is constructed, the eNB may downlink control information (DCI), to which a cyclic redundancy check (CRC) scrambled with a paging-RNTI (P-RNTI) is attached, to the UE via a PDCCH and may transmit the RRC paging message to the UE via a PDSCH. That is, the eNB may transmit the RRC paging message to the UE through a PCCH of a logical channel, a PCH of a transmission channel, and a PDSCH of a physical channel.

The UE may monitor a PDCCH in a subframe belonging to a paging occasion of the UE on the basis of the P-RNTI. When the PDCCH masked with the P-RNTI is detected, the UE may decode the DCI transmitted on the PDCCH. The DCI may indicate a PDSCH resource via which the paging message is transmitted to the UE. The UE may decode the RRC paging message from the PDSCH resource indicated by the DCI.

A paging cycle may be determined to be cell-specific and may also be determined to be UE-specific. Further, a paging occasion may be determined for each UE on the basis of the paging cycle of each UE and an identifier (that is, IMSI) of each UE. Thus, the eNB may not transmit the paging message to all UEs on possible paging occasions but may transmit the paging message on a paging occasion set for a corresponding UE.

Hereinafter, a Paging Occasion (PO) will be Described.

A discontinuous reception (DRX) scheme for a UE is defined to minimize the power consumption of the UE. A UE using DRX may monitor whether a paging message is transmitted on only one paging occasion every paging cycle (that is, DRX cycle). One PF may refer to a single radio frame that may include one or more paging occasions. One paging occasion may refer to a single subframe in which a P-RNTI transmitted on a PDCCH addressing a paging message may be present. That is, a paging occasion may be defined as a particular subframe in a PF for a UE to check a paging message.

A PF and a PO may be determined using the IMSI and DRX values of a UE. A UE may compute a PF and a PO using the IMSI and DRX values of the UE. An eNB may compute a PF and a PO for each UE using an IMSI value received from an MME.

A DRX parameter (i.e., paging/PCCH configuration information) may be transmitted via a common radio resource configuration ('RadioResourceConfigCommon') IE, which is an RRC message used to specify a common radio resource configuration. The common radio resource configuration IE may be transmitted through an RRC message, such as an RRC connection reconfiguration message or an SI message. An SI message is a message used to transmit one or more SIBs.

In addition, the UE may request a DRX cycle thereof through an attach request or a TAU message. Here, a DRX cycle length set that the UE can request is the same as a length set used in system information.

Table 3 illustrates an example of PCCH configuration information in the common radio resource configuration IE.

TABLE 3

| | |
|---|---|
| PCCH-Config ::= | SEQUENCE { |
| defaultPagingCycle | ENUMERATED { |
| | rf32, rf64, rf128, rf256}, |
| nB | ENUMERATED { |
| | fourT, twoT, oneT, halfT, quarterT, |
| | oneEightnT, oneSixteenthT, |
| | oneThirtySecondT} |
| } | |

Referring to Table 3, the PCCH configuration information may include a defaultPagingCycle field indicating the default paging cycle length and a parameter 'nB' for obtaining a PF and a PO.

The defaultPagingCycle field may indicate the basis paging cycle length and may be set to any one value among rf32, rf64, rf128, and rf256. rf may denote a radio frame, and a number following rf may denote the number of radio frames. For example, when 'defaultPagingCycle'=rf32, a default paging cycle may include 32 radio frames. When 'defaultPagingCycle'=rf64, a default paging cycle may include 64 radio frames.

The parameter 'nB' may set to a multiple of T (4T, 2T, T, T/2, T/4, T/8, T/16, or T/32. For example, when 'nB'=fourT, the parameter 'nB' may have a value of 4*T. When 'nB'=quarterT, the parameter 'nB' may have a value of T/4.

Here, 'T' may represent the CRX cycle of a UE. 'T' may be determined to be the shortest value among a UE-specific DRX cycle (assigned by a higher layer) and a default DRX cycle ('defaultPagingCycle' field value) broadcast via system information. When the UE-specific DRX cycle is not set by the higher layer, 'T' may be determined to be the default DRX cycle.

A PF may be defined by Formula 1. A PF may be a SFN satisfying Formula 1 below.

$$SFN \bmod T = (T \operatorname{div} N)*(UE\_ID \bmod N) \quad \text{[Formula 1]}$$

The SFN may denote a number of a system frame to be paged, and N may be min(T, nB), and UE_ID may be (IMSI mod 1024).

The UE may not monitor all subframes in a PF determined as above. However, the UE may monitor only a subframe identified by a PO determined according to Formula 2 and Table 4.

$$i\_s = \operatorname{floor}(UE\_ID/N) \bmod Ns \quad \text{[Formula 2]}$$

Ns may be max(1, nB/T), N may be min(T, nB), and UE_ID may be (IMSI mod 1024).

Table 4 illustrates an example of a subframe pattern for determining a PO in FDD or TDD.

TABLE 4

| Ns | PO when i_s = 0 | PO when i_s = 1 | PO when i_s = 2 | PO when i_s = 3 |
|---|---|---|---|---|
| FDD: | | | | |
| 1 | 9 | N/A | N/A | N/A |
| 2 | 4 | 9 | N/A | N/A |
| 4 | 0 | 4 | 5 | 9 |
| TDD (all UL/DL configurations): | | | | |
| 1 | 0 | N/A | N/A | N/A |
| 2 | 0 | 5 | N/A | N/A |
| 4 | 0 | 1 | 5 | 6 |

A subframe index corresponding to a PO may be determined by applying an i_s value determined by Formula 2 to Table 4. That is, the UE may monitor only the subframe corresponding to the PO within the determined PF.

Hereinafter, Extended Idle Mode DRX (eDRX) will be Described.

eDRX defined in Release 13 is a technique for reducing the power consumption of a UE. A DRX cycle, which is conventionally up to 2.56 seconds, can be set to at least tens of seconds and up to tens of minutes. That is, a long idle mode can be set for a UE. When a UE supports eDRX and runs only an application that is not sensitive to delay, the UE may request the application of eDRX from a network in order to reduce power consumption. In order to apply eDRX, the UE may request an eDRX cycle desired by the UE from an MME during an attach/TAU procedure. The MME may reject or allow the application of eDRX by the UE. When the MME allows the UE to apply eDRX, the UE needs to apply an eDRX cycle provided by the MME and to activate eDRX. Here, even though the MME provides an eDRX cycle that is different from a value requested by the UE, the UE needs to apply the eDRX cycle provided by the MME. When no eDRX cycle is included in an NAS accept (i.e., attach accept or TAU accept) message received by the UE, the UE may recognize that the eDRX request is rejected and may apply the conventional default DRX cycle (up to 2.56 seconds). An eDRX cycle is present as a multiple of 2, starts from 5.12 seconds (i.e., 5.12, 10.24, 20.48 seconds, . . . ), and is up to 2621.44 seconds (43.69 minutes). The conventional DRX scheme may be applied in an eDRX cycle of 5.12 seconds, and the newly defined eDRX scheme may be applied in an eDRX cycle of 10.24 seconds or longer.

A hyper-SFN (H-SFN) is a higher frame of a SFN. One H-SFN may include 1024 SFNs. When the UE applies eDRX, paging may be performed in a particular paging hyperframe (PH). The MME may compute the PH using a formula defined by RAN2 on the basis of negotiated parameters (i.e., an IMSI and an eDRX cycle (extended idle mode DRX period)). The PH may be an H-SFN satisfying the following Formula 3.

$$\text{H-SFN mod } T_{eDRX,H} = (\text{UE\_ID mod } T_{eDRX,H}) \quad \text{[Formula 3]}$$

$T_{eDRX,H}$ may denote the eDRX cycle of a UE in a hyperframe, may be any one of hyperframe 1 to hyperframe 256, and may be set by a higher layer. UE_ID may be a remainder obtained by dividing the IMSI of a UE by 1024.

When the MME computes a PH for an eDRX-supportive UE, if a large number of UEs have the same PH, the MME may simultaneously transmit paging messages to the UEs at the beginning of the PH since the MME knows only the PH rather than a paging frame (PF) in the PH. As a result, a large number of S1 signallings may occur at a particular time. Therefore, it may be necessary to propose a method for an MME to perform paging.

Hereinafter, a method for an MME to perform paging on the basis of an nB value will be described according to an embodiment of the present invention.

For the distributed transmission of paging messages to UE having the same PH, the MME may receive the nB value of an eNB from the eNB. The MME may compute a PF on the basis of the nB value and may perform paging on the basis of the PF.

Figure 6:
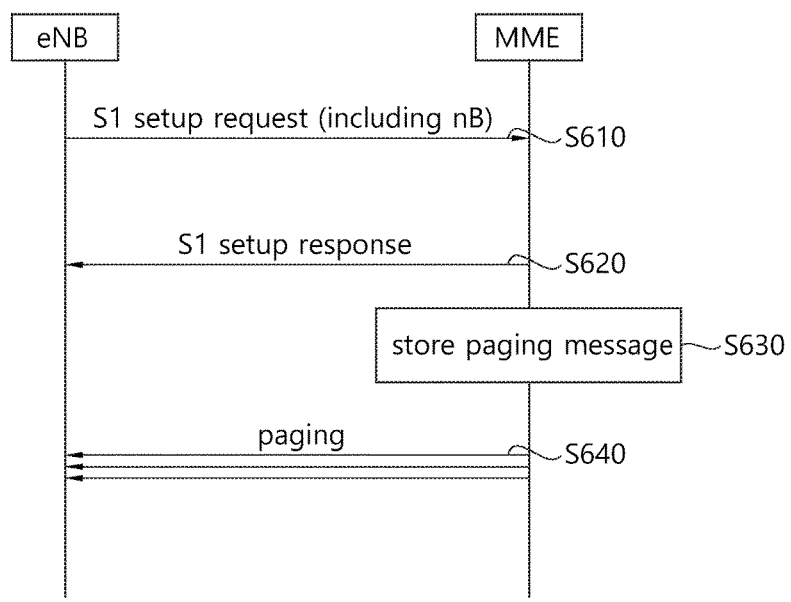
FIG. 6 illustrates a method for an MME to perform paging on the basis of a received nB value according to an embodiment of the present invention.

FIG. 6 illustrates a method for an MME to perform paging on the basis of a received nB value according to an embodiment of the present invention.

Referring to FIG. 6, in step S610, an eNB may transmit an nB value to the MME. The nB value may be included in an S1 Setup Request message. For example, the S1 Setup Request message may be defined as in Table 5 below.

TABLE 5

| IE/Group Name | Presence | Range | Criticality | Assigned Criticality |
|---|---|---|---|---|
| Message Type | M | | YES | reject |
| Global eNB ID | M | | YES | reject |
| eNB Name | O | | YES | ignore |

TABLE 5-continued

| IE/Group Name | Presence | Range | Criticality | Assigned Criticality |
|---|---|---|---|---|
| Supported TAs | | 1..<maxnoofTACs> | GLOBAL | reject |
| >TAC | M | | — | |
| >Broadcast PLMNs | | 1..<maxnoofBPLMNs> | — | |
| >>PLMN Identity | M | | | |
| Default Paging DRX | M | | YES | ignore |
| CSG Id List | | 0..1 | GLOBAL | reject |
| >CSG Id | | 1 .. <maxnoofCSGIds> | | |
| nB | O | | YES | ignore | nB may be defined as in Table 6.

TABLE 6

| IE/Group Name | Presence | IE type and reference | Criticality | Assigned Criticality |
|---|---|---|---|---|
| nB | M | ENUMERATED(4T, 2T, T, T/2, T/4, T/8, T/16, T/32, . . . ) | YES | reject |

In step S620, upon receiving the message from the eNB, the MME may store the received nB value. The MME may use the stored nB value when computing a PF together with a PH. The MME may compute a PF on the basis of an IMSI, a DRX period, and nB. For example, the PF may be computed by Formula 1. For example, the PH may be calculated by Formula 3. The DRX period may be shorter one of a UE-specific DRX and the default DRX of the eNB. The MME may transmit an S1 Setup Response message to the eNB.

In step S630, the MME may store a paging message. The paging message may be a paging message for an eDRX-supportive UE.

In step S640, the MME may transmit the paging message to the eNB. The paging message may be transmitted on the basis of the PH and the PF. For example, the paging message may be transmitted via at least any one subframe belonging to a system frame indicated by the PH and the PF. When the PF is different among target eNBs that belongs to a paging area, the MME may transmit the paging message on the basis of the earliest PF among different eNBs.

This paging procedure may be applied to a UE with eDRX set up.

Figure 7:
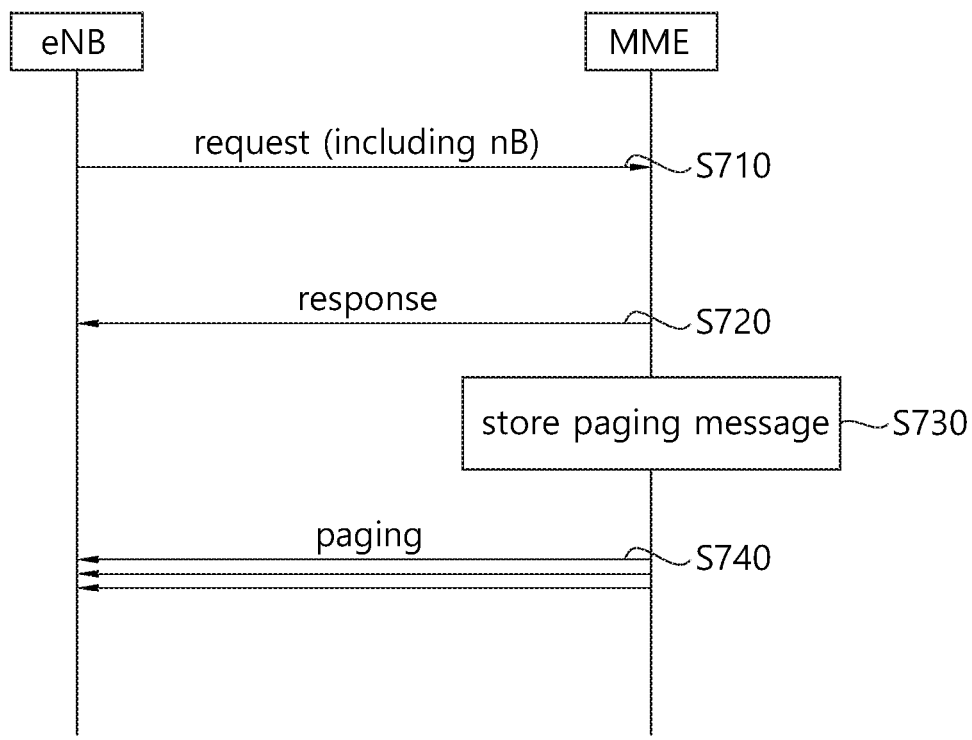
FIG. 7 illustrates a method for an MME to perform paging on the basis of a changed nB value according to an embodiment of the present invention.

FIG. 7 illustrates a method for an MME to perform paging on the basis of a changed nB value according to an embodiment of the present invention.

After an S1 setup procedure is performed, when the nB value of an eNB is changed, the eNB may inform the MME of the changed nB.

Referring to FIG. 7, in step S710, the eNB may transmit the changed nB value to the MME. The nB value may be included in a Request message. The Request message may be a new message. The Request message may be an eNB Configuration Update message. For example, the eNB Configuration Update message may be defined as in Table 7.

TABLE 7

| IE/Group Name | Presence | Range | Criticality | Assigned Criticality |
|---|---|---|---|---|
| Message Type | M | | YES | reject |
| eNB Name | O | | YES | ignore |
| Supported TAs | | 0..<maxnoofTACs> | GLOBAL | reject |
| >TAC | M | | — | |
| >Broadcast PLMNs | | 1..<maxnoofBPLMNs> | — | |
| >>PLMN Identity | M | | — | |
| CSG Id List | | 0..1 | GLOBAL | reject |
| >CSG Id | | 1 .. <maxnoofCSGId> | — | |
| Default Paging DRX | O | | YES | ignore |
| nB | O | | YES | ignore | nB may be defined as in Table 8.

TABLE 8

| IE/Group Name | Presence | IE type and reference | Criticality | Assigned Criticality |
|---|---|---|---|---|
| nB | M | ENUMERATED(4T, 2T, T, T/2, T/4, T/8, T/16, T/32, . . . ) | YES | reject |

In step S720, upon receiving the message from the eNB, the MME may replace a previously stored nB value with the changed nB value. The MME may use the replaced nB value when computing a PF together with a PH. The MME may compute a PF on the basis of an IMSI, a DRX period, and the replaced nB. For example, the PF may be computed by Formula 1. For example, the PH may be calculated by Formula 3. The DRX period may be shorter one of a UE-specific DRX and the default DRX of the eNB. The MME may transmit a Response message to the eNB. The Response message may be a new message. The Response message may be an eNB Configuration Update Acknowledge message.

In step S730, the MME may store a paging message. The paging message may be a paging message for an eDRX-supportive UE.

In step S740, the MME may transmit the paging message to the eNB. The paging message may be transmitted on the basis of the PH and the PF. For example, the paging message may be transmitted via at least any one subframe belonging to a system frame indicated by the PH and the PF. When the PF is different among target eNBs that belongs to a paging area, the MME may transmit the paging message on the basis of the earliest PF among different eNBs.

This paging procedure may be applied to a UE with eDRX set up.

Figure 8:
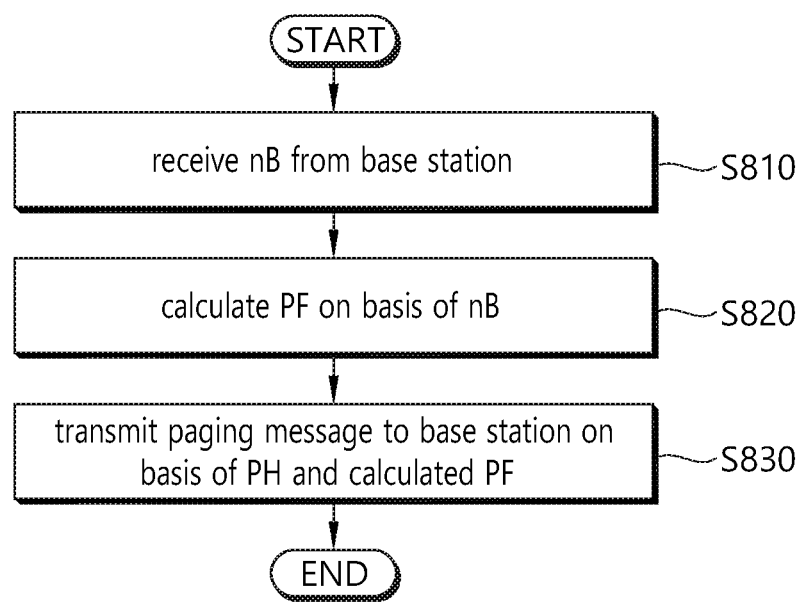
FIG. 8 is a block diagram illustrating a method for an MME to perform paging according to an embodiment of the present invention.

FIG. 8 is a block diagram illustrating a method for an MME to perform paging according to an embodiment of the present invention.

Referring to FIG. 8, in step S810, the MME may receive an nB value from an eNB. The nB value may be included in an S1 Setup Request message. Alternatively, the nB value may be included in an S1 eNB Configuration Update message.

In step S820, the MME may compute a PF on the basis of the nB value.

The PF may be computed on the basis of the nB value, UE_ID, and a DRX cycle.

The PF may be an SFN satisfying the following formula:

SFN mod $T = (T \text{ div } N)*(UE\_ID \text{ mod } N)$, where T may denote the DRX cycle of a UE, UE_ID may be a remainder obtained by dividing the IMSI of the UE by 1024, and N may be a smaller value of the DRX cycle and the nB value.

The nB value may be any one of 4T, 2T, T, T/2, T/4, T/8, T/16, and T/32.

The PH may be computed on the basis of UE_ID and an eDRX cycle.

The PH may be an H-SFN satisfying the following formula:

H-SFN mod $T_{eDRX,H}$ = UE_ID mod $T_{eDRX,H}$, where $T_{eDRX,H}$ may denote the eDRX cycle of a UE, and UE_ID may be a remainder obtained by dividing the IMSI of the UE by 1024.

In step S830, the MME may transmit a paging message to the eNB on the basis of the PH and the computed PF. The PH may indicate a number of a hyper system frame via which the paging message is transmitted, and the PF may indicate a number of a system frame via which the paging message is transmitted. The hyper system frame may include 1024 system frames. The paging message may be transmitted via at least any one subframe belonging to the system frame indicated by the PH and the PF.

This paging may be performed for a UE with eDRX set up.

The MME may store the paging message. The paging message may be a paging message for an eDRX-supportive UE.

Figure 9:
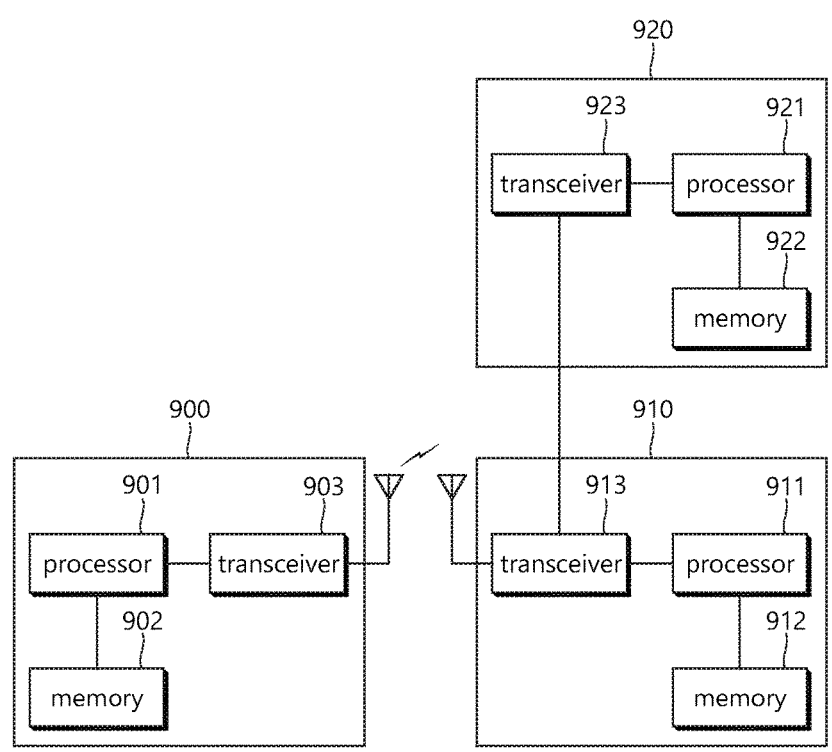
FIG. 9 is a block diagram illustrating a wireless communication system according to the embodiment of the present invention.

FIG. 9 is a block diagram illustrating a wireless communication system according to the embodiment of the present invention.

A UE 900 includes a processor 901, a memory 902, and a transceiver 903. The memory 902 is connected to the processor 901, and stores various information for driving the processor 901. The transceiver 903 is connected to the processor 901, and transmits and/or receives radio signals. The processor 901 implements proposed functions, processes and/or methods. In the above embodiment, an operation of the UE may be implemented by the processor 901.

A BS 910 includes a processor 911, a memory 912, and a transceiver 913. The memory 912 is connected to the processor 911, and stores various pieces of information for driving the processor 911. The transceiver 913 is connected to the processor 911, and transmits and/or receives radio signals. The processor 911 implements proposed functions, processes and/or methods. In the above embodiment, an operation of the BS may be implemented by the processor 911.

An MME 920 includes a processor 921, a memory 922, and a transceiver 923. The memory 922 is connected to the processor 921, and stores various pieces of information for driving the processor 921. The transceiver 923 is connected to the processor 921, and transmits and/or receives radio signals. The processor 921 implements proposed functions, processes and/or methods. In the above embodiment, an operation of the MME may be implemented by the processor 921.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for transmitting a paging message by a mobility management entity (MME) in a wireless communication system, the method comprising:
   receiving a first nB from a first base station (BS);
   receiving a second nB from a second BS,
   wherein the first BS and the second BS belongs to a same paging area;
   obtaining a first paging frame (PF) related to a first system frame number on which the paging message is transmitted, based on the first nB;
   obtaining a second PF related to a second system frame number on which the paging message is transmitted, based on the second nB; and
   when the obtained first PF is different from the obtained second PF, transmitting the paging message to the first BS and the second BS based on a paging hyperframe (PH) and the obtained first PF,
   wherein the obtained first PF related to the first system frame number is earlier than the obtained second PF related to the second system frame number, and
   wherein the PH relates to a hyper system frame number on which the paging message is transmitted.

2. The method of claim 1, wherein the paging message is transmitted on at least any one subframe belonging to a system frame related to the PH and the obtained first PF.

3. The method of claim 1, wherein first nB and second nB are included in an S1 Setup Request message.

4. The method of claim 1, wherein first nB and second nB are included in an S1 eNB Configuration Update message.

5. The method of claim 1, wherein the first PF is obtained based on the first nB, UE_ID, and a DRX cycle.

6. The method of claim 5, wherein the first PF is an SFN which is obtained based on the following equation:

$$\text{SFN mod } T = (T \text{ div } N)*(\text{UE\_ID mod } N),$$

where T is the DRX cycle of a user equipment (UE), UE_ID is a remainder obtained by dividing an international mobile subscriber identity (IMSI) of the UE by 1024, and N is a smaller value of the DRX cycle and the first nB.

7. The method of claim 6, wherein the first nB is at least one of 4T, 2T, T, T/2, T/4, T/8, T/16, and T/32.

8. The method of claim 1, wherein the PH is obtained based on UE_ID and an eDRX cycle.

9. The method of claim 8, wherein the PH is a hyper-system frame number (H-SFN) which is obtained based on the following equation:

$$\text{H-SFN mod } T_{eDRX,H} = \text{UE\_ID mod } T_{eDRX,H},$$

where $T_{eDRX,H}$ is the eDRX cycle of a user equipment (UE), and UE_ID is a remainder obtained by dividing an IMSI of the UE by 1024.

10. The method of claim 1, further comprising storing, by the MME, the paging message.

11. The method of claim 1, wherein the paging message is transmitted to a user equipment (UE) with extended discontinuous reception (eDRX) set up.

12. The method of claim 1, wherein the hyper system frame includes 1024 system frames.

13. A mobility management entity (MME) for transmitting a paging message in a wireless communication system, the MME comprising:
   a memory;
   a transceiver; and
   a processor to connect the memory and the transceiver,
   wherein the processor is configured to:
      control the transceiver to receive a first nB from a first base station (BS),
      control the transceiver to receive a second nB from a second BS,
      wherein the first BS and the second BS belongs to a same paging area,
      obtain a first paging frame (PF) related to a first system frame number on which the paging message is transmitted, based on the first nB,
      obtain a second PF related to a second system frame number on which the paging message is transmitted, based on the second nB,
      when the obtained first PF is different from the obtained second PF, control the transceiver to transmit the paging message to the first BS and the second BS based on a paging hyperframe (PH) and the obtained first PF,
      wherein the obtained first PF related to the first system frame number is earlier than the obtained second PF related to the second system frame number, and
      wherein the PH relates to a hyper system frame number on which the paging message is transmitted.

14. The MME of claim 13, wherein the nB first nB and second nB are included in an S1 Setup Request message.

15. The MME of claim 13, wherein the first PF is obtained based on the first nB, UE_ID, and a DRX cycle.

* * * * *